United States Patent [19]

Knettig et al.

[11] 4,252,643

[45] Feb. 24, 1981

[54] REMOVAL OF TOXIC AND ODOROUS ORGANICS FROM WASTE WATER BY SATURATED ACTIVATED CARBON

[75] Inventors: Eva Knettig, Thornhill; J. Christopher Kempling, Sarnia, both of Canada

[73] Assignee: Exxon Research & Engineering Co., Florham Park, N.J.

[21] Appl. No.: 36,336

[22] Filed: May 7, 1979

[51] Int. Cl.³ .............................................. C02F 1/28
[52] U.S. Cl. .................................. 210/662; 210/670; 210/694
[58] Field of Search ......................... 210/25, 30 R, 40; 585/821, 828

[56] References Cited

U.S. PATENT DOCUMENTS

| 3,340,316 | 9/1967 | Wackher et al. ..................... 585/828 |
| 4,025,426 | 5/1977 | Anderson et al. ..................... 210/25 |

OTHER PUBLICATIONS

Lawson et al., "Limitations of Activated Carbon Adsorption for Upgrading Petrochemical Effluents", AIChE Symposium Series–Water, (1973).
Paulson, "Adsorption as a Treatment of Refinery Effluent", American Petroleum Institute Division on Refining, (1970), pp. 693-722.
Giusti et al., "Activated Carbon Adsorption of Petrochemicals", Journal WPCF, vol. 46, No. 5, (May 1974), pp. 947-964.

*Primary Examiner*—Ivars C. Cintins
*Attorney, Agent, or Firm*—James H. Callwood; Edward H. Mazer

[57] ABSTRACT

An adsorption process for the selective removal of naphthalenic hydrocarbons in the waste water from a petrochemical operation which comprises contacting the effluent waste water for relatively short periods with activated carbon which has become saturated with respect to non-naphthalenic organics. Contact of the waste water streams with the saturated carbon is continued until the breakthrough of naphthalenic compounds in the waste water exceeds a predetermined concentration, such as 2 ppm. It has been found that efficient removal of naphthalenic compounds can be effected by contacting the waste water for relatively short contact times, for example 10 minutes, notwithstanding the fact that the activated carbon has previously become saturated with respect to non-naphthalenic compounds.

8 Claims, 1 Drawing Figure

REMOVAL OF TOXIC AND ODOROUS ORGANICS FROM WASTE WATER BY SATURATED ACTIVATED CARBON

BACKGROUND OF THE INVENTION

1. Field of the Invention

This invention relates to a process for the removal of organics which are acutely toxic to marine life and malodorous from the waste water of petrochemical operations. More particularly, the invention is directed to the removal of naphthalenic compounds, the constituents of petrochemical plant waste water which have been found to contribute most strongly to odor in the waste water and which have been found to be acutely toxic to marine life.

2. DESCRIPTION OF THE PRIOR ART

As concern for the maintenance of a healthy unpolluted environment has grown, clean water quality criteria have become increasingly stringent. Of particular concern has been the effect of waste water constituents from petroleum refining and petrochemical operations, which constituents may be malodorous and/or acutely toxic to marine life.

Almost all of the hydrocarbons present in the waste water from petroleum refining and petrochemical operations have been found to be toxic to marine life at high concentrations. Similarly, all of the constituents have been found to contribute to the odor of the water. For example, benzene in concentrations of about 10 mg/l was found to be toxic to marine life. Toluene and xylene were found to be toxic at concentrations of about 20 mg/l. In contrast, naphthalenes have been found to be toxic to marine life in concentrations as low as 2 mg/l (which is equivalent to 2 ppm).

Several methods have been considered for more efficient treatment of waste water. Of these methods, removal of the residual organic compounds from waste water by activated carbon adsorption has received much attention.

E. G. Paulson in a paper entitled, "Adsorption as a Treatment of Refining Effluent," investigated the technical and economic feasibility of treating refinery effluent by means of a granular activated carbon waste treatment process. The results of that study were that granular activated carbon treatment can produce a refinery effluent containing less than 20 mg/l of BOD (biochemical oxygen demand) and less than 10 units of RON (recognition odor number) from either primary or secondary refinery effluents. Paulson further concluded that those organic compounds contributing to odor are preferentially adsorbed relative to total mixture of organic contaminants. From this it was concluded that, based on a desired effluent quality of less than 20 mg/l of BOD and less than 10 units of RON, the controlling constituent in the operation of an adsorption system will be the BOD.

D. M. Giusti, R. A. Conway and C. T. Lawson investigated the adsorptive capacities of various carbons for specific organic compounds. Among the compounds investigated were alcohols, aldehydes, amines, pyridines, esters, ethers, ketones, organic acids and a number of aromatic compounds. The aromatics investigated were benzene, toluene, ethylbenzene, phenol, hydroquinone, aniline, styrene, and nitrobenzene. There was no investigation, however, of fused ring aromatic compounds such as naphthalene. The result of this study showed that as molecular weight increases and as polarity, solubility and branching decrease, the degree of adsorption onto activated charcoal increases predictably.

In a paper entitled "Limitations of Activated Carbon Adsorption for Upgrading Petrochemical Effluents," C. T. Lawson and John A. Fischer concluded that excellent removal of MEP and thio-resistant polyethers was still being achieved after a significant breakthrough of the gross parameter COD (chemical oxygen demand) has occurred. Additionally, it was found that "foamability" was suppressed. From this it was concluded that polyethers could still be removed and "foamability" could be suppressed when the net adsorptive capacity of the carbon for COD and MEP had been exhausted.

While prior art processes have shown excellent results in removing hydrocarbon pollutants from the effluent waste water in petroleum refining and petrochemical operations, a serious drawback to the conventional activated carbon adsorption disclosed in those processes has been the long contact times required to achieve satisfactory reduction of hydrocarbons. These long contact times have necessitated regeneration of large quantities of activated carbon and have added measurably to the overall treatment cost.

In accordance with the present invention, it has been found that the regeneration costs for the removal of acutely toxic and malodorous naphthalenic compounds can be greatly reduced by contacting the waste water for short contact time periods with activated carbon which has become substantially saturated with respect to its ability to remove non-naphthalenic compounds. It has been found that naphthalenic compounds continue to be adsorbed after the capacity of the carbon to adsorb non-naphthalenic compounds has become exhausted. It has also been found that these naphthalenic compounds are adsorbed very rapidly so that reduction of the level of naphthalenic compounds to below a predetermined acceptable toxicity level, i.e., less than 2 ppm, is rapidly achieved.

The process of the claimed invention employs short contact times, taking advantage of the tendency of naphthalenic compounds to be rapidly adsorbed. Since acceptable toxicity levels can be achieved with short contact times, longer contact times, which would not provide any meaningful improvement in toxicity removal are avoided. Hence the expense associated with regeneration of the carbon is reduced.

SUMMARY OF THE INVENTION

A continuous adsorption process for the selective removal of naphthalenic hydrocarbons in a waste water stream containing said naphthalenic hydrocarbons, which comprises:

(a) passing said waste water stream through a bed of activated carbon which has become saturated with respect to its ability to adsorb non-naphthalenic hydrocarbons;

(b) monitoring the effluent waste water from the activated carbon bed to determine the concentration of naphthalenic hydrocarbon therein; and (c) discontinuing passage of said waste water stream through said bed of activated carbon when the concentration of naphthalenic hydrocarbon in the effluent waste water exceeds a predetermined concentration.

DETAILED DESCRIPTION OF THE INVENTION

The aqueous solutions which can be treated in accordance with this invention will typically be waste water streams containing fused ring aromatics, such as naphthalene, and related compounds, such as benzene, toluene, xylene, phenol, etc. Representative of such streams are effluent water from petroleum refineries, petrochemical plants and the like. Typically these streams will contain 20 to 1500 ppm by weight of non-naphthalenic organic compounds and 0 to 25 ppm by weight of naphthalenic compounds. Such streams will be characterized by an unacceptably strong malodorous smell. An indication of unacceptably high levels of odor is Threshhold Odor Number (TON), which is measured by standard procedures as published in "Standard Methods for Examination of Water and Wastewater," 14th Edition, procedure APHA 200, the disclosures of which are herein incorporated by reference. The threshhold odor number is defined as the number of units of odorfree water required per unit of sample to yield the least definitely perceptible odor. The objective in the process of the instant invention is to attain a TON of less than 128.

The activated carbon which can be used in the process of the claimed invention may be any of a number of commercially available activated carbons. For example, Filtrasorb 300 and 400, activated carbons which are commercially available from Calgon, a subsidiary of Merck & Co., Inc., have provided excellent results. Filtrasorb 300 has a surface area of 950–1050 $M^2/g$, a pore volume of 0.85 cc/g and a minimum iodine number of 950, while the corresponding figures for Filtrasorb 400 are 1050–1200 $M^2/g$, 0.94 cc/g and 1050. There is no reason, however, to believe that other commercially available activated carbon materials of comparable physical and chemical properties would not work as well.

The activated carbon which can be utilized in the process of the present invention has an equilibrium adsorption capacity ranging from about 0.05 to about 0.2 lb. TOC/lb. carbon and from about 0.6 pounds of naphthalenes per pound of carbon when the concentration of naphthalene in the solution is equal to about 5 ppm, to about 0.7 pounds of naphthalene per pound of carbon when the concentration of naphthalene in the solution equals to about 7 ppm.

The tendency of toxic and malodorous naphthalenic constituents to be readily adsorbed upon activated carbon permits the removal of naphthalenic constituents from effluent waste water by contacting the waste water with activated carbon for only very short times.

The concentration of naphthalenic compounds in waste water can be reduced to nontoxic and nonmalodorous levels by contacting the waste water with activated carbon for as short a period as 3 minutes, more preferably approximately 10 minutes. These contact times may equate to 2 USGPM/ft$^2$ and 6 USGPM/ft$^2$, respectively, depending upon the depth of the carbon bed. The process can be better understood with reference to the following detailed description.

Figure 1:
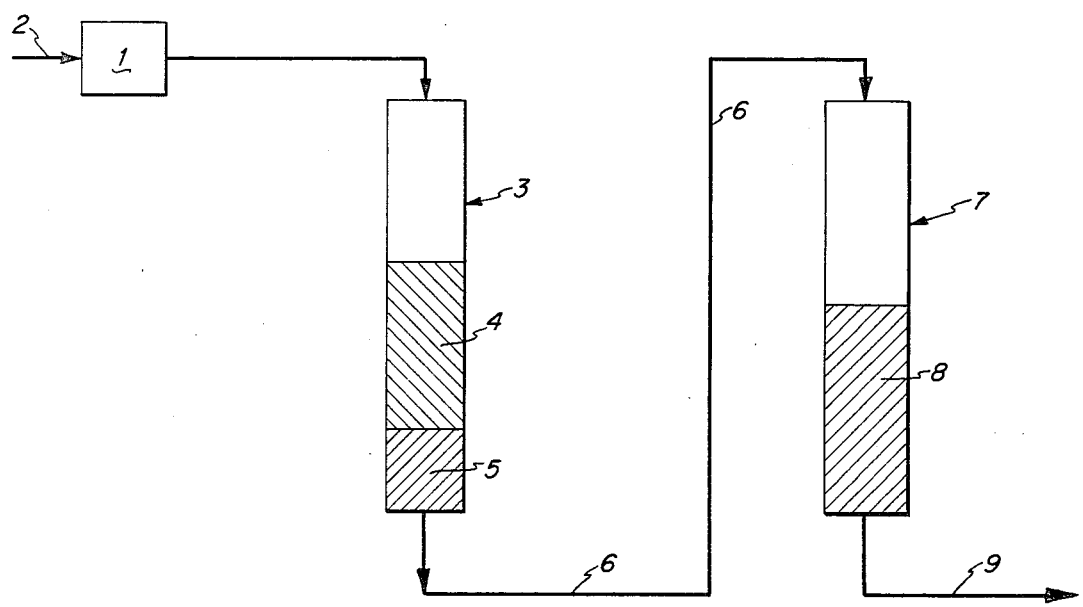
FIG. 1 is a schematic representation of the process of the claimed invention. Referring to the Figure in detail, toxic, malodorous waste water from a petrochemical operation is passed through oil separator 1 disposed in line 2 prior to entering filter 3. Filter 3 does not form a part of the invention. Accordingly, any filter capable of removing insoluble contaminants from the waste water would be acceptable. In the subject Figure, filter 3, designed to remove insoluble contaminants from the water, comprises an upper layer 4 of an anthracite having a 1.1 mm effective particle size and preferably being at least two feet deep, and a lower layer 5 of sand, preferably having a 0.45 mm effective particle size and being at least one foot in depth. After passing through filter 3, the waste water is directed through line 6 to vessel 7, which contains a bed 8 of activated carbon which is substantially saturated with respect to its ability to remove non-naphthalenic compounds. The bed depth will vary dependent upon the desired residence time and the naphthalenic concentration in the effluent, as previously discussed. Effluent from vessel 7 passes through line 9 for discharge from the treatment system. Since bed 8 will require periodic regeneration, it may be necessary to include a plurality of beds, so that naphthalenic compounds may be removed from waste water even when one of the beds is being regenerated.

Samples of effluent stream 9 should be taken periodically to determine when naphthalenic breakthrough occurs, and also to monitor the relative odor and toxicity of the effluent particularly to aquatic life.

DESCRIPTION OF THE PREFERRED EMBODIMENTS

EXAMPLE 1

Samples were taken of effluent after passing through a 1.5 foot deep carbon bed (3.75 minutes contact time at 3 USGPM/ft$^2$ flow rate) and a 3-foot deep carbon bed (7.5 minutes contact time at 3 USGPM/ft$^2$ flow rate). The continuous carbon adsorber was operated for almost two months. The feed employed was the effluent from an oil separator which was filtered through a pilot dual media filter prior to entering the carbon adsorber. The day-to-day analyses are indicated in Table I. The carbon became saturated with TOC (total amount of organics in milligrams per liter, mg/l) at a very early stage of the test in the case of the bed having a 1.5 ft. depth of activated carbon. After only 4 days, the 1.5 foot carbon bed depth yielded an effluent having approximately the same concentration of TOC (66 mg/l) as the feed (55 mg/l). In the case of the bed having a 3 ft. depth of activated carbon, the effluent yielded approximately the same concentration of TOC as the feed after 6 days of operation (52 mg/l in the effluent compared with 50 mg/l in the feed). In both cases, however, naphthalenes continued to be adsorbed to levels which were nontoxic; i.e., to levels of less than 2 ppm until the forty-third day with the 1.5 ft. deep carbon bed product and the forty-fifth day with the 3.0 ft. deep carbon bed product.

These tests show that even though the carbon has become saturated with respect to its ability to adsorb non-naphthalenic compounds, it can still be used to effectively remove naphthalenic compounds to nontoxic levels by utilizing short contact time treatments.

TABLE I

ACTIVATED CARBON ADSORPTION PERFORMANCE TEST #1

| | TOC | | | Naphthalenes | | |
|---|---|---|---|---|---|---|
| Days | Feed Mg/L | 1.5 Ft. Bed Depth Effluent Mg/L | 3 Ft. Bed Depth Effluent Mg/L | Feed Mg/L | 1.5 Ft. Bed Depth Effluent Mg/L | 3 Ft. Bed Depth Effluent Mg/L |
| 1 | 44.5 | 14.5 | 27 | 4.26 | 0 | 0 |
| 2 | 192 | 36 | 17 | | | |
| 3 | 64 | 102 | 14 | | | |
| 4 | 59 | 66 | 29.5 | | | |
| 5 | 52.5 | 53.5 | 35 | | | |
| 6 | 50 | 43.5 | 52 | | | |
| 7 | 41 | 36 | 43.5 | 2.47 | 0 | 0 |
| 8 | 68.5 | 28 | 40 | 5.42 | 0 | 0 |
| 9 | 25.5 | 24 | 32.5 | | | |
| 10 | 27 | 25.5 | 31 | 3.41 | 0 | 0 |
| 11 | 25 | 29.5 | 33 | 3.92 | 0 | 0 |
| 12 | 24.5 | 23 | 22 | | | |
| 13 | 26 | 22 | 36.5 | | | |
| 14 | 369 | 284 | 211.5 | | | |
| 15 | 2288 | 2287 | 2262 | 1.33 | 0 | 0 |
| 16 | 130 | 78 | 53.5 | | | |
| 17 | 149.5 | 108 | 72 | 74.75 | 27.11 | 7.30 |
| 20 | 49 | 52.5 | 57 | 8.28 | 0.13 | 0 |
| 21 | 49 | 48.5 | 50 | 4.64 | 0 | 0 |
| 22 | 41 | 46 | 44 | 1.28 | 0 | 0 |
| 23 | 83 | 50 | 49 | | | |
| 24 | 39 | 45 | 42 | 6.18 | 1.79 | 0 |
| 27 | 33 | 35 | 41.5 | 4.6 | 0.39 | 0 |
| 28 | | | | 6.16 | | 0.39 |
| 29 | 28.5 | 28 | 25 | 6.25 | 0.38 | 0 |
| 30 | 30 | 24 | 19 | | | |
| 31 | 37 | 28 | 28 | 4.97 | 0.40 | 0 |
| 35 | 22.5 | 21.5 | 22 | 5.08 | 0.42 | 0 |
| 36 | 60 | 33 | 31 | 2.03 | 0.20 | 0 |
| 37 | 100.5 | 49.5 | 27.5 | 6.37 | | 0.28 |
| 38 | 37 | 30 | 32 | 4.10 | 0.99 | 0 |
| 41 | 36.5 | 36.5 | 44 | 4.4 | 1.35 | 0.11 |
| 42 | 23.5 | 26 | 30.5 | | | |
| 43 | 26 | 26 | 28.5 | 9.12 | 1.37 | 0.31 |
| 44 | 35 | 33.5 | 34 | 7.69 | | |
| 45 | 45 | 38 | 37.5 | 18.49 | 6.60 | 0.87 |
| 48 | 49.5 | 57.5 | 81.5 | 32.02 | 12.23 | 2.51 |
| 49 | 81.5 | 65.5 | 57.5 | | | |
| 50 | 62 | 59 | 61 | 15.67 | 6.24 | 3.11 |
| 51 | 55.5 | 51 | 56 | | | |
| 52 | 63 | 66 | 70 | 12.78 | 6.78 | 2.57 |
| 55 | 26 | 27 | 27.5 | 11.38 | 6.42 | 2.14 |
| 56 | 30 | 30 | 30 | 13.26 | 4.23 | 1.68 |
| 57 | 63.5 | 63 | 66 | 10.64 | 5.75 | 3.19 |
| 58 | | | | 14.09 | 6.08 | 3.04 |

EXAMPLE 2

In the second test, the results of which are shown in Table II, the filtered effluent from an oil separator was passed downflow through a 3 ft. deep bed of carbon at a flow rate of 2 USGPM/ft.$^2$ and an estimated contact time of 11 minutes. This experiment showed that, with the longer contact time, naphthalenes removal down to less than 1 ppm was effected in every case except those at the very end of the test. Since naphthalene levels approaching 2 ppm have been found to be acceptable, it is clear that this relatively short contact time will produce acceptable toxicity levels without using unnecessarily large amounts of activated carbon.

This test also served to show that TON could be substantially reduced by the short contact time treatment.

TABLE II

ACTIVATED CARBON ADSORPTION PERFORMANCE TEST #2

| | TOC | | Naphthalenes | | TON | |
|---|---|---|---|---|---|---|
| Days | Feed Mg/L | Effluent Mg/L | Feed Mg/L | Effluent Mg/L | Feed | Effluent |
| 1 | 478.5 | 113.5 | 2.72 | | | Nil |
| 2 | 198 | 161 | 2.72 | Nil | | Nil |
| 3 | 1263 | 1222 | | | | Nil |
| 4 | 403 | 203 | 2.77 | 0.14 | | Nil |
| 7 | 318 | 218 | 2.88 | | | Slight |
| 8 | 381 | 310 | 1.54 | Trace | 64 | 32 |
| 9 | 285 | 244 | | | | Slight |
| 10 | 256 | 230 | | | | Slight |
| 11 | 145 | 120 | 185 | Nil | 256 | 16 |
| 14 | 40 | 62 | 4.12 | 0.06 | 256 | 32 |
| 15 | 51 | 53 | | | | |
| 16 | 56 | 46 | 7.33 | 0.08 | 512 | 32 |
| 17 | 241 | 156 | 2.73 | | 128 | 128 |
| 18 | 84 | 142 | 12.85 | 0.78 | 256 | 256 |
| 21 | 79 | 56 | 6.43 | 0.04 | 64 | 16 |
| 22 | 36 | 44 | | | 256 | 16 |
| 23 | 68 | 46 | 8.81 | 0.02 | 512 | 16 |
| 24 | 265 | 235 | 16.53 | | 2050 | 128 |
| 25 | 51 | 55 | 9.63 | 0.04 | 2050 | 64 |
| 28 | 99 | 41 | 12.88 | 0.20 | 2050 | 64 |
| 29 | 97 | 63 | | | 1024 | 128 |
| 30 | 56 | 55.5 | 5.95 | 0.07 | | |
| 31 | 532 | 477 | 4.46 | | 4100 | 1024 |

TABLE II-continued

ACTIVATED CARBON ADSORPTION PERFORMANCE TEST #2

| Days | TOC Feed Mg/L | TOC Effluent Mg/L | Naphthalenes Feed Mg/L | Naphthalenes Effluent Mg/L | TON Feed | TON Effluent |
|---|---|---|---|---|---|---|
| 32 | 381 | 381 | 10.99 | 0.24 | 4100 | 1024 |
| 33 | 156 | 181 | 14.60 |  | 2050 | 512 |
| 34 | 144 | 149 | 15.42 | Nil | 4100 | 1024 |
| 37 | 148 | 85 | 37.80 |  | 2050 | 512 |
| 38 | 84 | 98 | 15.32 | 0.15 | 2050 | 572 |
| 39 | 106 | 84 | 15.29 | 0.05 | 1024 | 256 |
| 40 | 89 | 79 | 9.10 |  | 512 | 128 |
| 41 | 76 | 89 | 8.69 | 0.02 | 128 | 64 |
| 44 | 256 | 252 | 4.56 | 0.37 |  |  |
| 45 | 330.5 | 305 | 3.89 | 0.26 | 1024 | 512 |
| 46 | 169 | 226 | 5.24 | 0.43 | 1024 | 512 |
| 47 | 123 | 123 |  |  | 512 | 512 |
| 48 | 567 | 256 | 1.93 | 0.22 | 256 | 256 |
| 51 | 212 | 237 | 3.67 | 0.18 | 237 | 64 |
| 52 | 128 | 132.5 |  |  | 1024 | 128 |
| 53 | 67.5 | 75.5 | 13.06 | 0.10 | 2050 | 64 |
| 54 | 64 | 57 |  |  | 2050 | 64 |
| 55 | 51 | 52 | 13.42 | Nil | 512 | 128 |
| 58 | 164.5 | 101 |  |  | 8200 | 512 |
| 59 | 96 | 92 |  |  | 512 | 256 |
| 60 | 93 | 84 | 14.12 | 0.73 | 512 | 256 |
| 65 | 89 | 90 | 10.94 | 2.62 | 1024 | 512 |
| 67 | 65 | 64 | 10.51 | 2.80 | 256 | 256 |
| 69 | 50 | 63 | 10.20 | 4.49 |  |  |

The foregoing examples serve to illustrate the fact that:

Naphthalenic compounds are preferentially adsorbed onto activated carbon when compared with the adsorption rate of non-naphthalenic compounds;

Naphthalenic compounds will continue to be adsorbed by activated carbon which has become exhausted with respect to its ability to adsorb non-naphthalenic compounds;

The preferential adsorption of naphthalenic compounds to nontoxic levels requires only a short contact time, thereby decreasing the amount of activated carbon required and lowering the regeneration costs associated therewith.

What is claimed is:

1. A continuous adsorption process for the selective removal of naphthalenic hydrocarbons in a waste water stream containing said naphthalenic hydrocarbons, which comprises:
   (a) passing said waste water stream through a bed of activated carbon which has become saturated with respect to its ability to adsorb non-naphthalenic hydrocarbons;
   (b) monitoring the effluent waste water from the activated carbon bed to determine the concentration of naphthalenic hydrocarbon therein; and
   (c) discontinuing passage of said waste water stream through said bed of activated carbon when the concentration of naphthalenic hydrocarbon in the effluent waste water exceeds a predetermined concentration.

2. The process of claim 1 wherein the passage of said waste water stream through said bed of activated carbon is discontinued when the naphthalenic hydrocarbon concentration in the effluent waste water exceeds about 2 ppm by weight.

3. The process of claim 2 wherein the duration of time necessary to effect removal of naphthalenic hydrocarbons to a concentration level of less than 2 ppm by weight ranges from about 3 to 10 minutes.

4. The process of claim 3 wherein the passage of the aqueous solution is discontinued and the bed of activated carbon regenerated, when the naphthalenic hydrocarbon concentration of the aqueous solution exiting from the bed exceeds about 2 ppm by weight.

5. The process of claim 4 wherein the waste water stream containing said naphthalenic compounds is a waste water stream from a petrochemical plant.

6. The process of claim 5 wherein the concentration of naphthalenic hydrocarbons in the waste water stream entering the bed of activated carbon is less than 25 ppm by weight.

7. The process of claim 6 wherein the concentration of non-naphthalenic organic compounds in the waste water stream entering the bed of activated carbon ranges from 20 to 1500 ppm by weight.

8. The process of claim 6 wherein the capacity of the bed of activated carbon for the removal of non-naphthalenic compounds ranges from 0.05 to 0.2 lb. TOC/lb. carbon.

* * * * *